(12) United States Patent
Sellars et al.

(10) Patent No.: US 11,092,420 B2
(45) Date of Patent: Aug. 17, 2021

(54) PROBE AND CAP THEREFOR

(71) Applicant: Elcometer Limited, Manchester (GB)

(72) Inventors: Michael Carrington Sellars, Cheshire (GB); Thomas Partington, Leeds (GB); Graham Scott Hopper, Lancashire (GB)

(73) Assignee: Elcometer Limited, Manchester (GB)

( * ) Notice: Subject to any disclaimer, the term of this patent is extended or adjusted under 35 U.S.C. 154(b) by 348 days.

(21) Appl. No.: 16/287,742

(22) Filed: Feb. 27, 2019

(65) Prior Publication Data

US 2019/0271530 A1 Sep. 5, 2019

(30) Foreign Application Priority Data

Mar. 2, 2018 (GB) ...................................... 1803434

(51) Int. Cl.
| | | |
|---|---|---|
| *G01B 5/016* | (2006.01) | |
| *G01B 5/06* | (2006.01) | |
| *G01B 5/28* | (2006.01) | |
| *G01B 7/00* | (2006.01) | |
| *G01B 21/08* | (2006.01) | |
| *G01B 21/30* | (2006.01) | |
| *G01B 7/06* | (2006.01) | |

(52) U.S. Cl.
CPC ............ *G01B 5/016* (2013.01); *G01B 5/066* (2013.01); *G01B 5/28* (2013.01); *G01B 7/001* (2013.01); *G01B 7/105* (2013.01); *G01B 21/08* (2013.01); *G01B 21/30* (2013.01)

(58) Field of Classification Search
CPC .................................. G01B 5/016; G01B 5/28

USPC ........................................................... 33/556
See application file for complete search history.

(56) References Cited

U.S. PATENT DOCUMENTS

| | | | |
|---|---|---|---|
| 1,060,076 | A | 4/1913 | Glowacki |
| 3,019,645 | A | 2/1962 | Lake |
| 4,301,338 | A * | 11/1981 | McMurtry ............. G01B 7/012 200/6 A |
| 5,557,854 | A * | 9/1996 | Fujioka ................. F16C 19/184 33/517 |
| 5,768,798 | A * | 6/1998 | Takahashi ................ G01B 3/22 33/784 |
| 6,894,492 | B1 | 5/2005 | Dziech |

(Continued)

FOREIGN PATENT DOCUMENTS

GB    2505193 A    2/2014

OTHER PUBLICATIONS

Trique, Michael, Examination Report for European Application No. 19275023.0, European Patent Office, dated Apr. 6, 2021.

*Primary Examiner* — George B Bennett
(74) *Attorney, Agent, or Firm* — Leydig, Voit & Mayer, Ltd.; Gerald T. Gray

(57) ABSTRACT

Probes are provided with caps, the caps comprise rolling bearing elements so that the probes can be slid along a surface to be measured, without damaging the surface or wearing away the tip of the probe or a sacrificial cap. The rolling bearing elements can be arranged in a ring around the probe tip, with the plane of the foremost edges of the rolling bearing elements a predetermined distance from the probe tip. The caps can comprise a housing with a grip, to encourage users to grip the cap, which comprises the rolling bearing elements, rather than the probe.

20 Claims, 9 Drawing Sheets

(56) References Cited

U.S. PATENT DOCUMENTS

| | | | |
|---|---|---|---|
| 2004/0118000 A1* | 6/2004 | Roth | G01B 11/007 33/556 |
| 2005/0166413 A1* | 8/2005 | Crampton | B25J 13/088 33/503 |
| 2006/0010702 A1* | 1/2006 | Roth | G01B 21/047 33/559 |
| 2008/0052936 A1* | 3/2008 | Briggs | G01B 5/012 33/502 |
| 2013/0298416 A1* | 11/2013 | Collingwood | G01B 5/012 33/503 |
| 2014/0202016 A1* | 7/2014 | Bridges | G01B 11/002 33/503 |
| 2016/0115781 A1* | 4/2016 | Douglas | E21B 47/08 33/544 |

* cited by examiner

PROBE AND CAP THEREFOR

CROSS REFERENCES

The present application for patent claims priority to United Kingdom Patent Application No. GB1803434.8 by Sellars et al., entitled "Probe and Cap Therefor," filed Mar. 2, 2018, and incorporated herein by reference in its entirety.

TECHNICAL FIELD

The present disclosure relates to probes, for example probes for measuring coating thickness or surface profile/roughness of a substrate. In particular, but not exclusively, the invention concerns caps for such probes.

BACKGROUND

When applying coatings to a substrate, it is common to carry out inspection at every stage to ensure compliance to the specification. From the preparation of the surface to be coated, through climatic condition monitoring to the dry film thickness evaluation, visual assessment and gauge-based testing is used to ensure adequate process control.

For steel surface preparation, the removal of rust and other contamination and the creation of a surface profile (or roughness) is required to enhance the adhesion of the applied coatings.

Instruments are known which comprise probes to measure thickness or surface roughness (referred to as surface profile), such probes are connected via leads to gauges which display the measurement.

Typically, such probes are placed against a surface for measurement in various locations, as desired.

However, it is also known to slide probes (in particular coating thickness measuring probes) along the surface of a substrate to obtain a rapid series of measurements (e.g. up to 140 readings per minute) of coating thickness.

In the latter case, to prevent damage/wear on the probe tip from rubbing against the substrate, it is known to provide a snap-on cap on the probe, such that in use, the cap is arranged between the probe tip and the surface, and it is the cap which runs along the surface. The cap is a sacrificial replaceable consumable, replaced more easily and at lower cost than replacing a worn probe tip.

There are disadvantages to providing a replaceable consumable cap, for example, the need to monitor how much it is worn and replaced it before the probe tip begins to wear, and the fact that as it wears, the probe tip moves closer to the surface it is measuring, which could affect the measurement.

The present invention seeks to overcome/ameliorate this or other disadvantages and/or to provide an improved probe/cap.

SUMMARY

According to a first aspect of the invention there is provided a probe for measuring a property of a substrate, or a cap for such a probe configured to be disposed at the tip of the probe; wherein the probe or cap comprises one or more rolling bearing elements arranged to bear on the substrate to be measured.

That is to say, the first aspect of the invention provides either (a) a probe for measuring a property of a substrate which is characterised by comprising one or more rolling bearing elements arranged to bear on the substrate to be measured, or (b) a cap for a probe for measuring a property of a substrate, the cap configured to be disposed at the tip of the probe and the cap being characterised by comprising one or more rolling bearing elements arranged to bear on the substrate to be measured.

Providing rolling bearing elements which bear on the substrate to be measured, can avoid the wearing discussed in relation to the prior art. This can obviate the need for replacement of the consumable cap whilst also keeping constant the distance between the tip of the probe and the surface to be measured (since the rolling bearing elements will not wear down, or at least will wear down much less quickly). Additionally, having a rolling bearing element bearing against the surface of the substrate is less likely to mark or damage the substrate.

The rolling bearing elements are preferably mounted for multi-axial movement; that is to say, the rolling bearing elements may be mounted so as to be rotatable about more than one axis, such that the probe can be moved in various directions along the substrate (i.e. in a probe having a longitudinal axis in the Z axis and pressed against the substrate in that Z axis, the rolling bearing elements may allow for rolling movement (i.e. movement by turning over on an axis) in both the X and Y directions).

The probe may comprise a cap, the cap comprising the one or more rolling bearing elements. Alternatively, the one or more rolling bearing elements could be integral with the probe. In one embodiment, the probe may comprise a nose cap and the nose cap may be connected to a roller cap, the roller cap comprising the one or more rolling bearing elements. In another embodiment, the one or more rolling bearing elements may be formed in the nose cap, so as to form a combined nose cap and roller cap.

The probe may be capable of measuring a property of a substrate without contact. The probe may be an electronic probe, an electromagnetic probe, an optical probe or a sonic probe. The probe may be a coating thickness measurement probe, or an average surface roughness measurement probe.

For certain probes, e.g. those intended for measurement of surface profile (i.e. average surface roughness), the distance between the probe and the surface to be measured must be accurately fixed. For example, in one probe of this type in development by the Applicant, for correct measurement, the distance between the tip and the surface to be measured must be 250 µm+/−50 µm. In view of manufacturing tolerances, adding a consumable cap to such a probe could take the distance between the tip and the surface to be measured outside the tolerance, either before the cap is worn down, or as it becomes worn. Accordingly, the provision of a cap with rolling bearing elements (or indeed integral rolling bearing elements) is especially advantageous for these probes.

The one or more rolling bearing elements may be a plurality of rolling bearing elements. In a probe, the plurality of rolling bearing elements may be arranged radially outwardly of the tip of the probe, optionally arranged in a ring surrounding the tip of the probe. In a cap, the plurality of rolling bearing elements may be arranged to be disposed radially outwardly of the tip of the probe in use, optionally arranged to be disposed in a ring surrounding the tip of the probe in use.

In a probe, the plane in which the rolling bearing elements are arranged may be orthogonal to a longitudinal axis of the probe. The tip of the probe may be arranged at one end of the longitudinal axis of the probe. In a cap, the plane in which the rolling bearing elements are arranged may be orthogonal to a longitudinal axis of the probe in use. In use, the tip of the probe may be arranged at one end of the longitudinal axis of the probe.

The one or more rolling bearing elements may be held in a cage. The cage may be annular. A shim, for example an annular shim such as a shim washer, may be provided behind the rolling bearing elements, opposite the region of the rolling elements which will bear on the substrate in use.

The one or more rolling bearing elements may be balls. Alternatively, the rolling bearing elements may be rollers.

A grip may be provided for gripping the probe, in use. The grip may depend from the one or more rolling bearing elements. In a cap provided with one or more rolling bearing elements, the cap may be provided with the grip.

The grip may be provided on a housing. The housing may house the one or more rolling bearing elements.

Where a plurality of rolling bearing elements are provided in a plane, the grip may extend perpendicular to the plane.

In a probe, the grip may be parallel with the longitudinal axis of the probe. The grip may be coaxial with the longitudinal axis of the probe. In a cap comprising one or more rolling bearing elements the grip may be parallel with the longitudinal axis of the probe in use. The grip may be coaxial with the longitudinal axis of the probe in use.

The grip may be tubular, optionally cylindrical. The grip may have a length of at least 3 cm, at least 3.5 cm, at least 5 cm or at least 10 cm extending away from the rolling bearing elements. This encourages the user to grip the grip. The grip may have a width of at least 2 cm, at least 3 cm, at least 4 cm or at least 5 cm. The grip may be between 3 cm and 5 cm long and between 2 cm and 4 cm wide.

The provision of a grip which depends from the one or more rolling bearing elements means that pressure by a user will be transferred directly to the rolling elements which bear against the surface, rather than to the probe tip. This can be useful both in avoiding damage and ensuring accurate alignment of the probe with the surface of the substrate. Misalignment may be as a result of flexing, for example. To be precise, a probe should normally be arranged orthogonally to the surface of the substrate which it will measure, and with the probe tip spaced by a predetermined gap. With a wider surface at the end where the tip of the probe will face the surface, if the user was to grip the probe in the usual way, typically by a relatively narrow grip (e.g. less than 2 cm wide) on a probe sleeve which depends rearward from the tip, it would be easy to misalign the longitudinal axis of the probe with the surface, such that some of the plurality of rolling elements did not touch the surface, and such that the tip of the probe is slightly further than intended from the surface. Or, if the tip was pushed hard against the surface, but at an angle, all the rolling elements could be pushed against a surface, but, the structure could flex, or cause flexion between the probe tip and the rolling elements, leading to potential damage or incorrect readings, due to the angular misalignment.

Providing a grip that depends from the rolling elements, rather than from the probe tip, makes it more likely that pressure will be applied to all of the rolling elements against the substrate, as does the provision of a wider grip. Provision of a longer grip makes it more likely that a user will hold the grip, rather than seeking to hold the probe itself.

Angular misalignment is a greater problem when measuring surface roughness, and the provision of rolling elements radially outwardly of the probe tip, can actually encourage better alignment.

In a probe, a predetermined axial gap may be provided between the region of the rolling bearing elements that contact the surface of the substrate and the tip of the probe. The rolling bearing elements may be incompressible.

The predetermined axial gap may be fixed.

The predetermined axial gap may be adjustable. In particular, in a probe comprising a nose cap and a roller cap comprising the one or more rolling bearing element, relative axial disposition of the nose cap and the roller cap may be adjustable. For example, the nose cap and the roller cap may be provided with corresponding threads, or may be arranged for slidable adjustment and fixed, for example by adhesion in position relative to one another once the correct axial gap is determined. This can allow for correction to an accurate gap once accommodation has been made for manufacturing tolerances. A seal, for example an o-ring, may be provided between the nose cap and the roller cap.

In a probe comprising a cap, the cap comprising rolling bearing elements, the cap may be fixedly attached to the probe (e.g. adhered thereto), or may be removeably attached (e.g. by a snap-fit).

The probe tip may be spring loaded.

A second aspect of the invention provides a measuring instrument comprising the probe of the first aspect, or comprising a probe fitted with a cap according to the first aspect (in either case optionally including any optional features). The measuring instrument may comprise a gauge arranged to receive signals from the probe and to output (optionally visually) one or more measurement. The gauge may be connected to the probe, and receive signals therefrom, via a lead.

A third aspect of the invention provides a method of measuring a property of a substrate using a probe according to the first aspect of the invention (optionally including any optional features), the method comprising placing the probe against the substrate such that the one or more rolling bearing elements bear on the surface of the substrate and moving the probe along the surface of the substrate, such that the one or more rolling bearing elements roll along the surface (i.e. moving along the surface by turning over and over on an axis).

The property may be coating thickness or average surface roughness.

BRIEF DESCRIPTION OF THE DRAWINGS

In order that the invention may be more clearly understood embodiments thereof will now be described, by way of example only, with reference to the accompanying drawings, of which.

DETAILED DESCRIPTION

Figure 1:
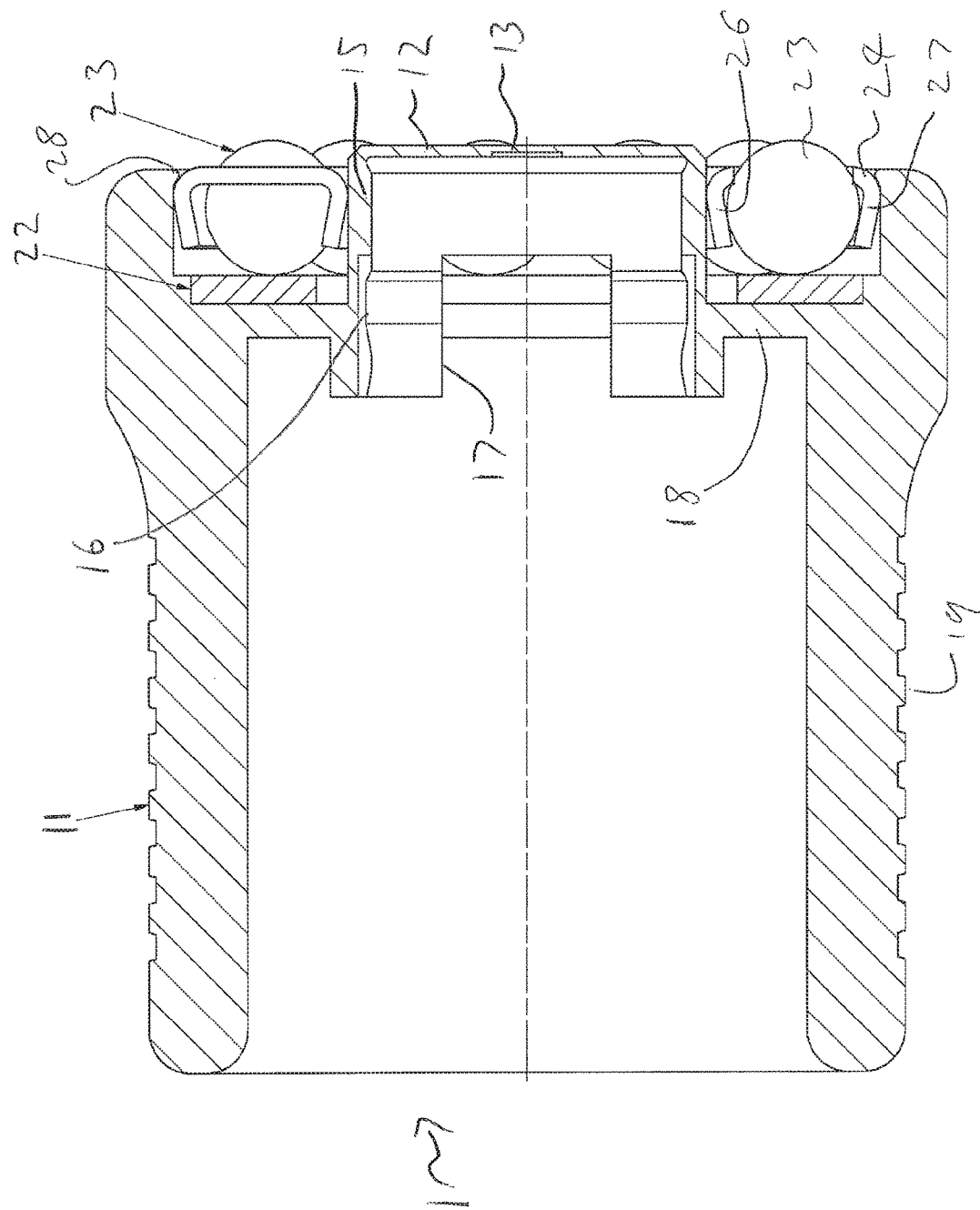
FIG. 1 shows a lateral cross-sectional view of a cap for a probe according to a first aspect of the invention.
Figure 2:
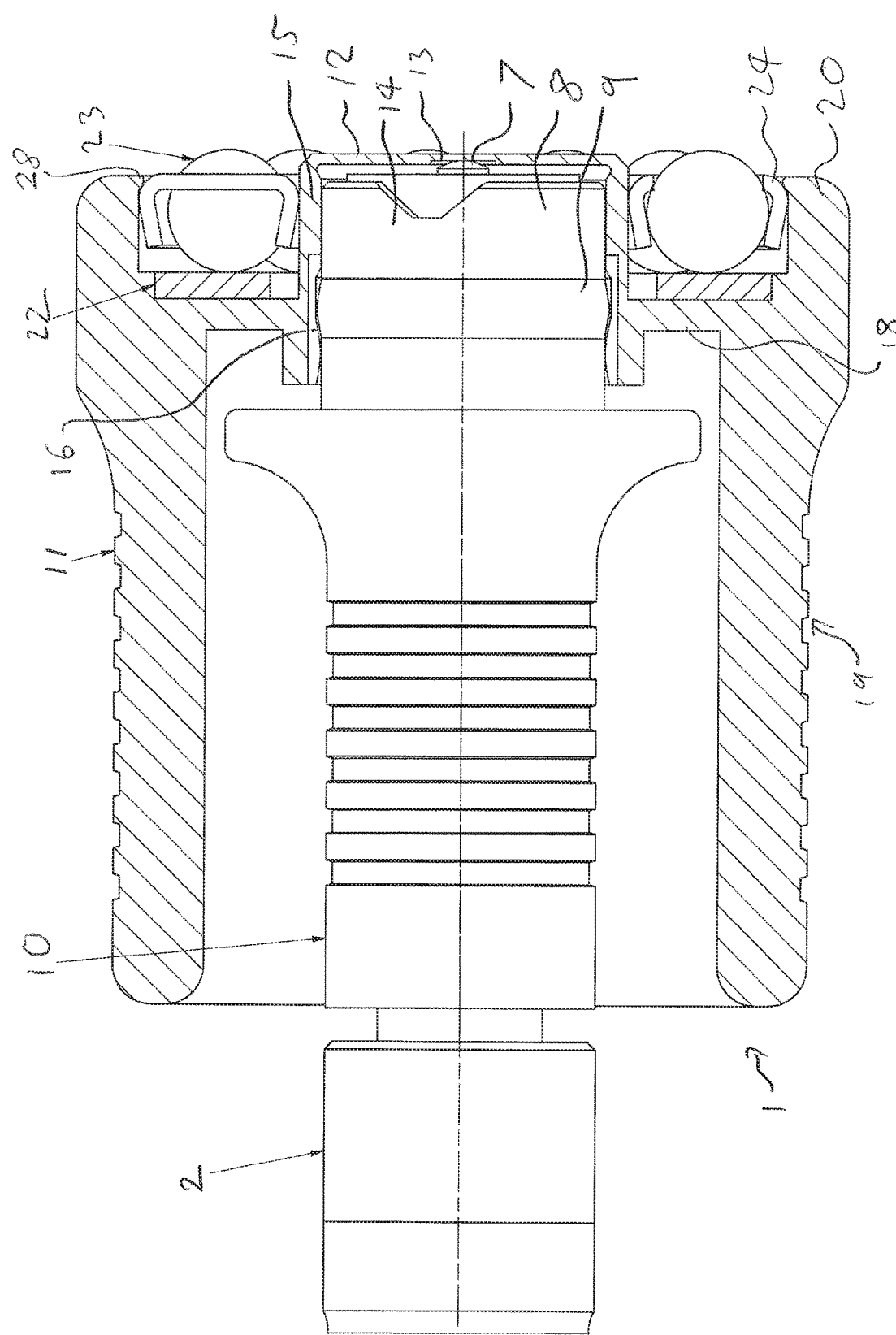
FIG. 2 shows a lateral cross section of the cap of FIG. 1 installed on a probe.

With reference to FIGS. 1 to 6, a cap 1 is provided for an electromagnetic probe 2 (visible in FIG. 2), which is used in an electronic instrument 3 (shown in FIG. 6) for measuring the thickness of a coating on a substrate (not shown). The instrument 3 comprises a gauge 4 connected to the probe 2 by a lead 5 so as to receive signals from the probe 2 and display measurements on a screen 6.

Such probes 2, leads 5 and gauges 4 are well known. One measuring instrument comprising such a probe is available commercially from Elcometer Ltd of Manchester, UK under the designation Elcometer 456 Coating Thickness Gauge. (The cap 1 of the first embodiment of the invention is intended to be incorporated into the Elcometer 456 Coating Thickness Gauge after the filing/priority date of this application.)

The probe 2 comprises a spring-loaded probe tip 7, which is used to obtain measurements of the thickness of coatings on substrates (not shown). Rearward of the probe tip 7, is the nose 14 of the body 8 of the probe 2. The body 8 and the nose 14 are generally cylindrical and a circumferential rib 9 is provided on the nose 14, extending radially outwardly therefrom. The rib 9 has a triangular profile and, as will be described later, is intended to snap-fit into a corresponding circumferential groove in the cap 1. Rearward of the circumferential rib 9, and the nose 14, a sleeve 10 is provided. This is the part which would normally be gripped by a user, were it not for the provision of the cap 1 of the invention. Indeed, with the cap 1 removed, the probe can be gripped by the sleeve 10 and used in the normal way.

The cap 1 is generally cylindrical in shape, formed of a generally tubular housing 11 having one open end and one closed end 12. It is about 3.5 cm long and 3 cm in diameter. The cap 1 is fitted to the probe 1 with its closed end 12 proximate to the tip 7. The closed end 12 includes an internal recess 13 at its centre, in which the extreme end of the probe tip 7 is seated. Radially outwardly of the recess 13, the closed end 12 is thicker and forms a disc-shaped central portion with a diameter slightly greater than that of the nose 14 of the probe 2. A cylindrical dividing wall 15 depends rearwardly from the periphery of the central portion of the closed end 12. This dividing wall 15 is provided with the circumferential groove 16 mentioned above, arranged to receive the circumferential rib 9 of the probe 2, as a snap-fit. The groove 16 has a relatively steeply sloped front surface opening out to, a section of constant (larger) diameter, followed (rearwardly) by a shallowly radially inwardly tapering section, the radially innermost extremity of which, in use, grips the nose 14 of the probe 2 behind the rib 9. The rib 9 sits within, and in close fit with, the section of constant, larger, diameter. Rearwardly of the innermost extremity of the inwardly tapering section, the dividing wall 15 tapers shallowly outwardly to its rearmost end, so as to provide a conical guide to receive the nose 14 of the probe 2 and guide it into the cavity defined by the dividing wall 15 and the central portion of the closed end 12.

In this embodiment, three equally spaced and relatively wide cutouts 17 extend from the rearmost end of the dividing wall 15 and forward slightly beyond the front of the groove 16. This allows a degree of flex in the dividing wall, so that the nose 14 of the probe 2 can be pushed into the groove 16, with the wall moving outward, then returning, elastically, to its original shape, so as to grip the nose 14 rearward of the rib 9. Those skilled in the art will readily choose a suitable material to provide this resilience, whilst being incompressible and stiff in other areas. As an example, the cap can be machined from Acetal (also known as Delrin or Polyoxymethylene).

An annular back wall 18 extends radially outwardly from the dividing wall 15, in the region of the groove 16 (specifically, in this embodiment, in the region of the transition between the section of constant diameter and the radially inwardly tapering section to the rear of the constant diameter section). The cutouts 17 extend into the annular back wall. At its outer circumference, the back wall 18 joins the generally cylindrical, tubular portion of the housing 11. This tubular portion extends rearward of the backwall for several centimetres, being arranged coaxially outwardly of the sleeve 10. On the outer surface of the rearwardly extending tubular portion of the housing 11, formations 19 in the form of circumferential corrugations are formed, so that the rearwardly extending tubular portion of the housing 11 forms a handle or grip, to be grabbed by the user. The provision of this grip arranged outwardly of the sleeve 10 of the probe encourages (or forces) the user to grab the device by the cap 1, rather than by the probe 2.

In addition to the tubular portion of the housing 11 which extends rearwardly of the back wall 18 forming the grip, a further, shorter, tubular portion of the housing 11 extends forward of the back wall 18, forming a mouth 20.

Thus, at the closed end 12 of the housing 11, the mouth 20, back wall 18 and dividing wall 15 define an annular cavity 21 (best seen in FIG. 3) which is open at the front of the cap 1. At the front of the mouth 20, a radially inwardly extending lip 28 is formed. Four narrow cutouts 29 (best seen in FIGS. 3 to 5) extend rearwardly from the front of the mouth.

At the back of the annular cavity 21 (i.e. adjacent the back wall 18), a recess is formed to receive a shim washer 22. The shim washer 22 is a close fit into the recess.

The shim washer 22 of this example is formed of hardened stainless steel and is arranged such that its front face provides a smooth running surface for a ring of rolling bearing elements 23, in this case eleven high-carbon chrome bearing steel balls.

Figure 3:
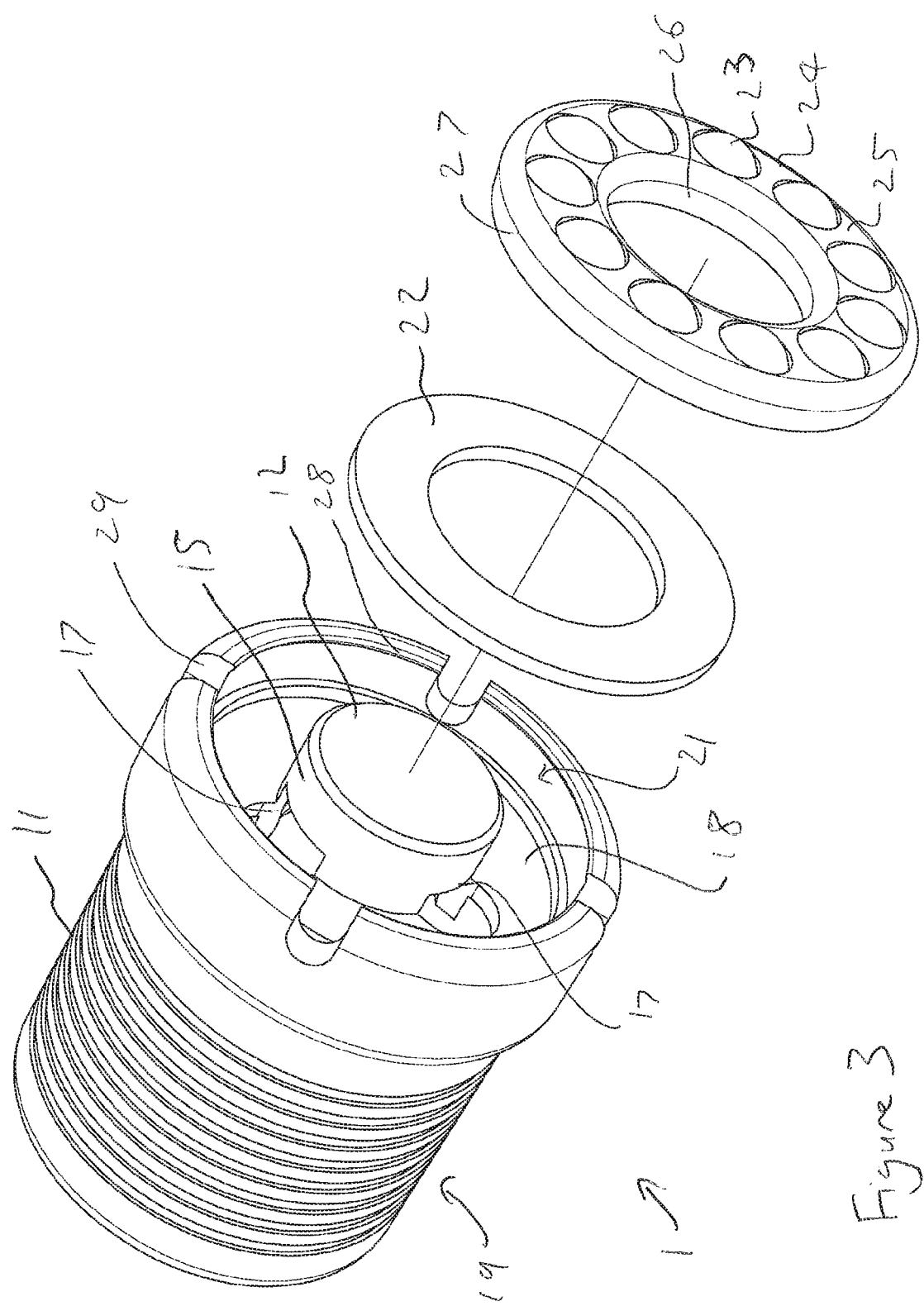
FIG. 3 shows an exploded perspective view of the cap of FIG. 1.
Figure 4:
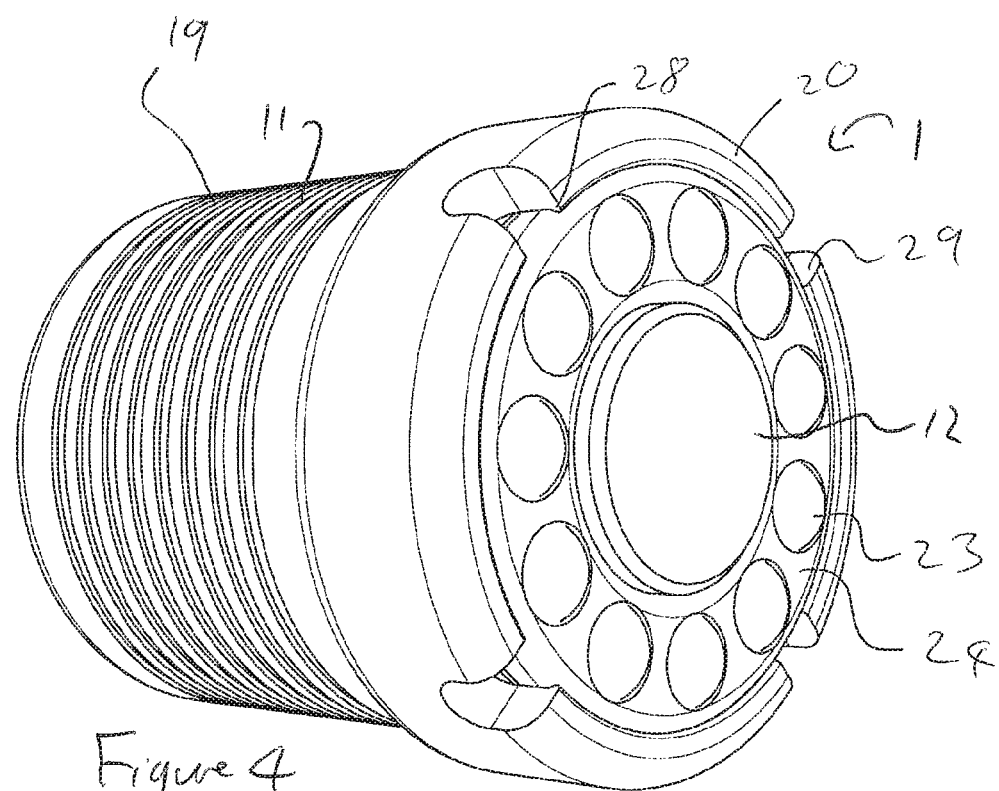
FIG. 4 shows a front perspective view of the cap of FIG. 1.
Figure 5:
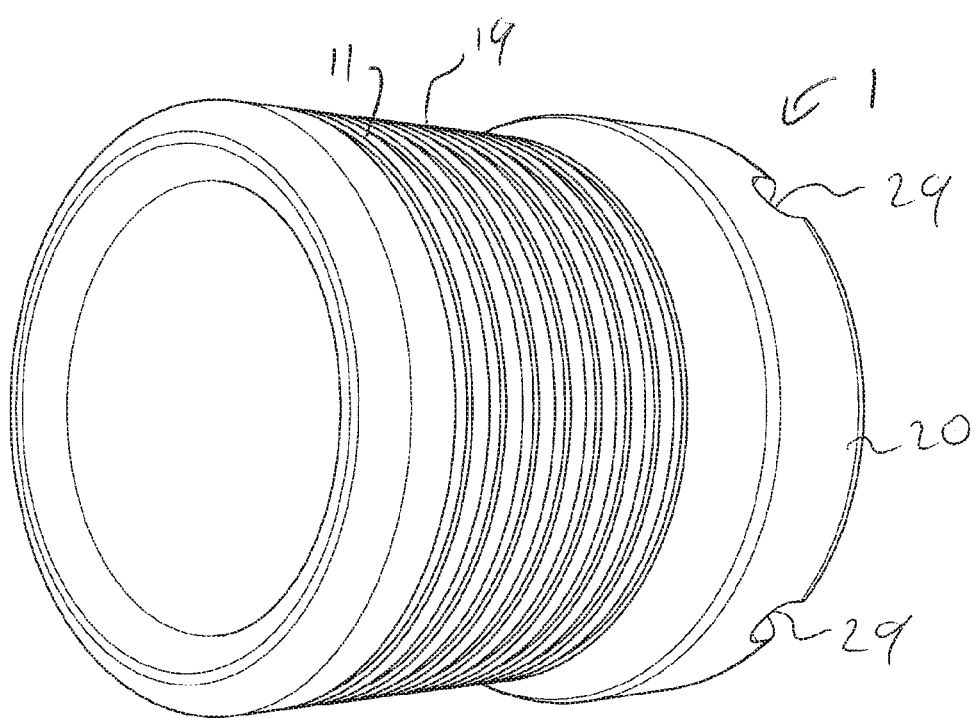
FIG. 5 shows a rear perspective view of the cap of FIG. 1.
Figure 6:
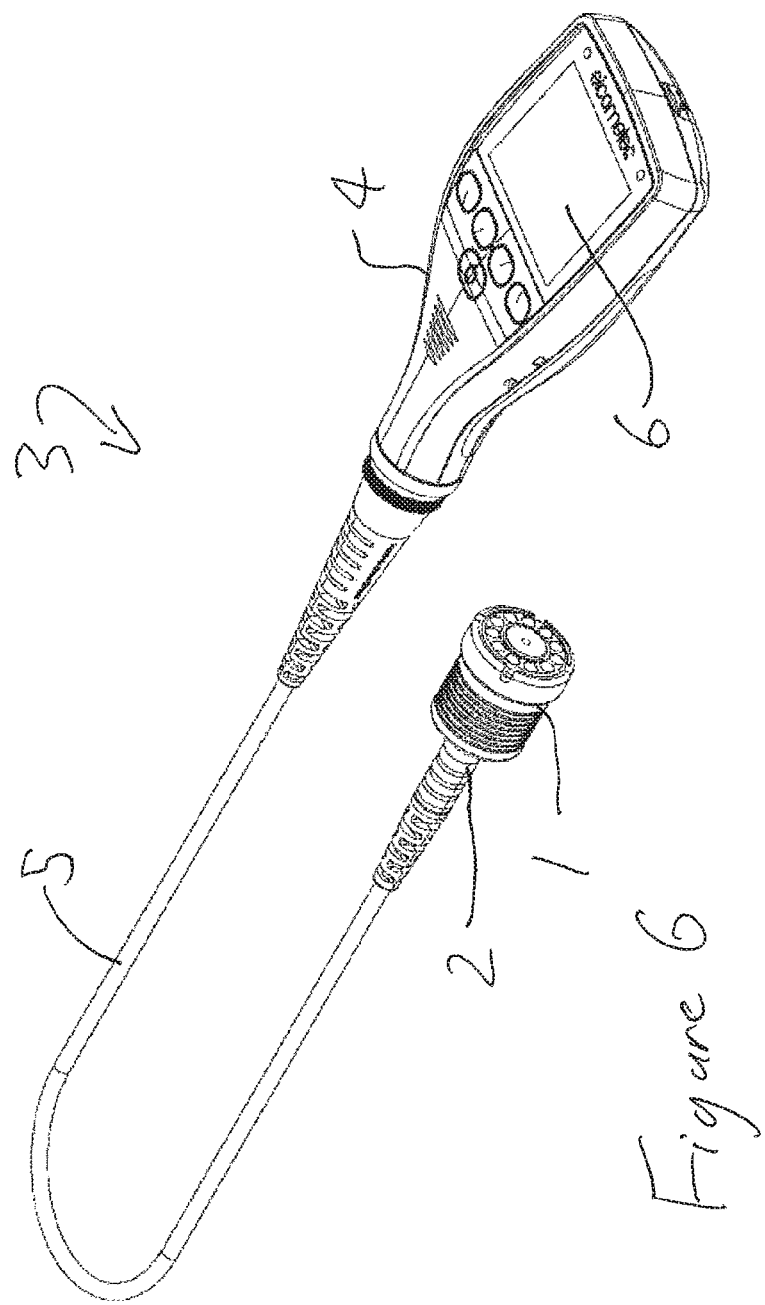
FIG. 6 shows a perspective view of a measuring instrument comprising the probe and cap of FIG. 2.
Figure 7:
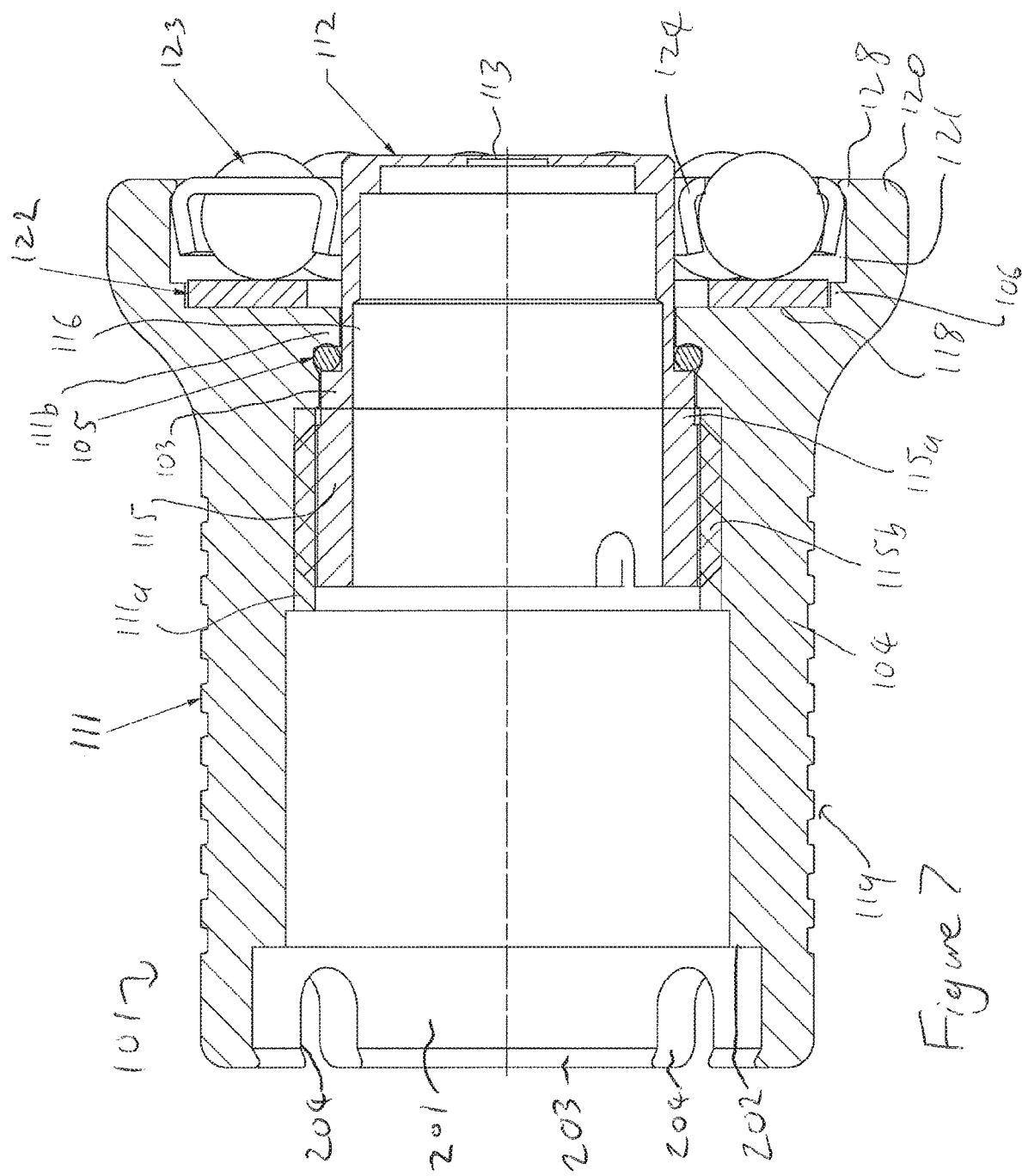
FIG. 7 shows a lateral cross-sectional view of a cap for a probe according to a second aspect of the invention.
Figure 8:
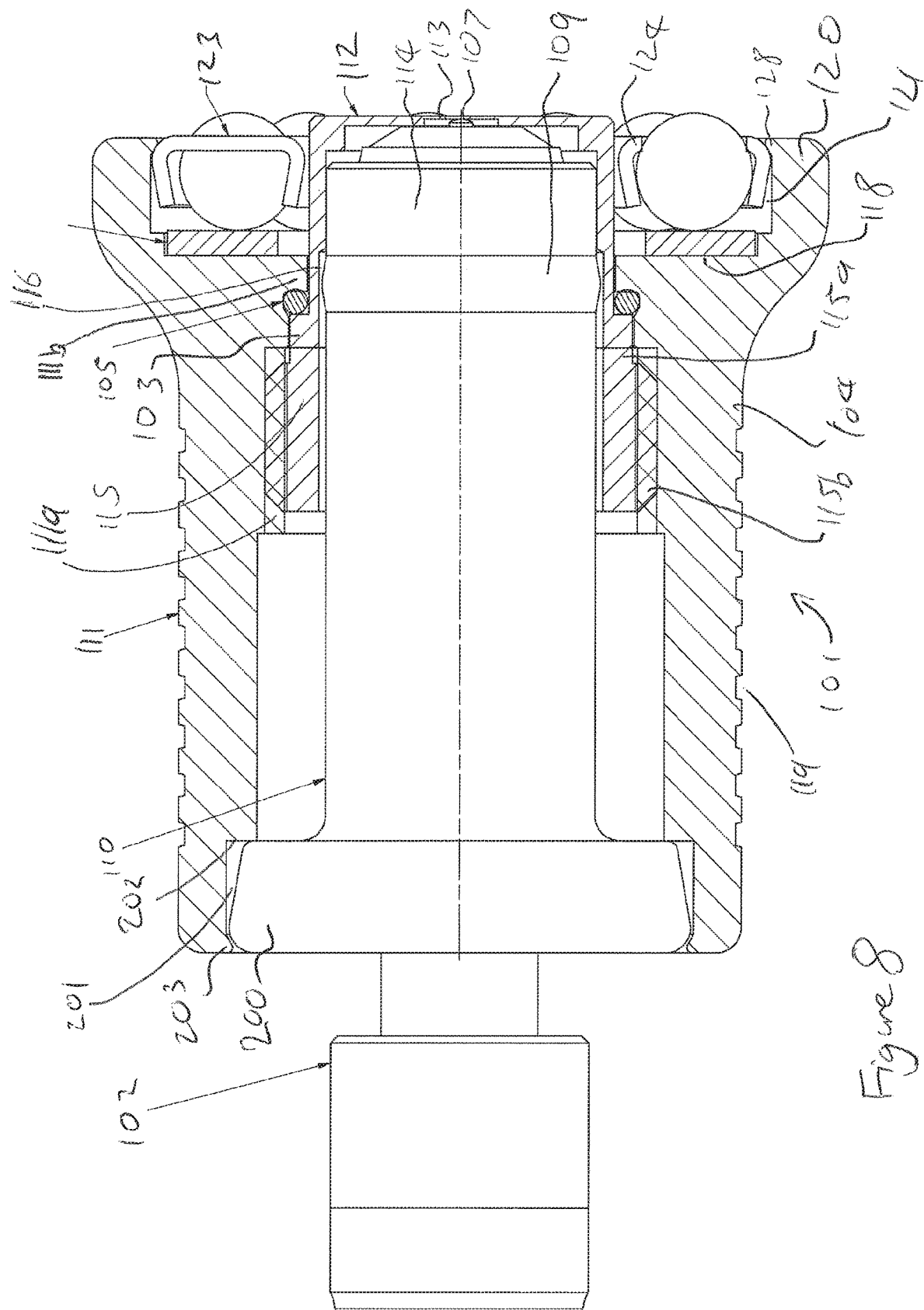
FIG. 8 shows a lateral cross section of the cap of FIG. 7 installed on a probe.

The rolling bearing elements 23 are held in place by an annular cage 24 of generally U-shaped cross section. As best seen in FIG. 3, the cage 23 has a flat annular front face 25, which is provided with eleven equally spaced circular apertures. Each aperture corresponds to a rolling bearing element 23 and has a diameter less than the diameter of the rolling bearing elements 23, so that the rolling bearing elements can protrude through the apertures, but cannot escape through the apertures. The outer periphery of the front face 25 is bevelled and from the inner and outer radial peripheries of the front face 25, an inner web 26, and an outer web 27 depend rearwardly.

The cage 24 is restrained in the cavity 21 by the lip 28 at the radially inner (and axially outer) edge of the mouth 20, which bears on the bevelled outer periphery of the front face 25.

Accordingly, the rolling bearing elements 23 are held in position between the inner edges of the apertures at the front and the shim washer 22 at the rear. However, the dimensions of the cage are closely controlled, such that the rolling bearing elements 23 are free to spin in any direction.

The control of the dimensions of the cage, together with the dimensions of the cavity and the thickness of the shim washer serve to fix the axial position of the balls, such that whilst they can freely rotate, the axial distance from their axially foremost point to the foremost point of the tip 7 of the probe is fixed.

To manufacture the cap 1, the housing is first formed as set out above, then, the shim washer 22 is installed in the recess in the cavity 21. After that, the cage 24 containing the balls (which may be purchased pre-assembled) is forced into the cavity. This pushes the lip 29 of the mouth 20 outwards, with the narrow cutouts 29 allowing the mouth 20 to flex outwards slightly, once the cage passes the lip 28, the mouth closes back to its original position, with the lip restraining the cage 24 and associated rolling bearing elements 23 in position.

The cap 1 can then be installed on the probe 2, simply by pushing the nose 8 of the probe 2 into the cavity defined by the dividing wall 15 and the central portion of the closed end 12, such that its tip sits in the internal recess 13 at the front of the cap 1 and its rib 9 sits in the circumferential groove 16. Owing to the larger cutouts 17, the cap 1 can also be manually removed from the probe 2 if so desired then snap fitted back on as required.

In use, with the cap 1 fitted on the probe 2, the measuring instrument 3 can be used to take continuous measurements of coating thickness along the surface of a substrate (not shown) without damaging the substrate or wearing down the cap 1. To achieve this, the user simply grabs the housing 11, holding the formations 19 on its tubular portion and presses the front of the cap 1, where the rolling bearing elements 23 are provided against the coated substrate. The user can then slide the cap 1 along the substrate (or slide the substrate with respect to the cap 1), with the balls rolling so as to avoid damage and wear, whilst also keeping the probe tip 7 a fixed distance from the surface of the coated substrate, so as to achieve accurate results whilst scanning the surface. Since the balls are mounted for multi-axial rotation, they can spin in any direction, and the probe can be moved in any direction along the substrate (i.e. considering the longitudinal axis of the probe to be the Z axis, it can be moved back and forth in both the X and Y directions and indeed in any direction in the XY plane.

As set out before, the size and position of the cap 1, and in particular the tubular portion of the housing that is provided with the gripping formations 19 encourages the user to hold the cap 1, not the probe 2. This encourages the cap to be pressed against the substrate in a manner in which the plane defined by the foremost edges of the rolling bearing elements 23 is against the surface of the substrate, parallel therewith. The plane of the rolling bearing elements 23 is coplanar with the closed front end 12 of the housing 11, and the dividing wall 15 is orthogonal thereto. The dividing wall 15 is coaxial with the longitudinal axis of the probe 2, so the longitudinal axis of the probe 2 will be orthogonal to the surface of the substrate being measured, ensuring accurate results.

A second embodiment of the invention is shown in FIGS. 7 to 11. In these figures, a cap 101 is shown that shares many features with the first embodiment. Accordingly, this description focuses on the differences. The cap 101 of the second embodiment is for use with an electromagnetic probe 102 (shown in FIG. 8) for measuring average surface roughness ("profile"), rather than coating thickness. The average surface roughness measurement probe 102 is incorporated into a measuring instrument comprising a gauge in the same manner as that of the first embodiment, so this is not shown.

Figure 9:
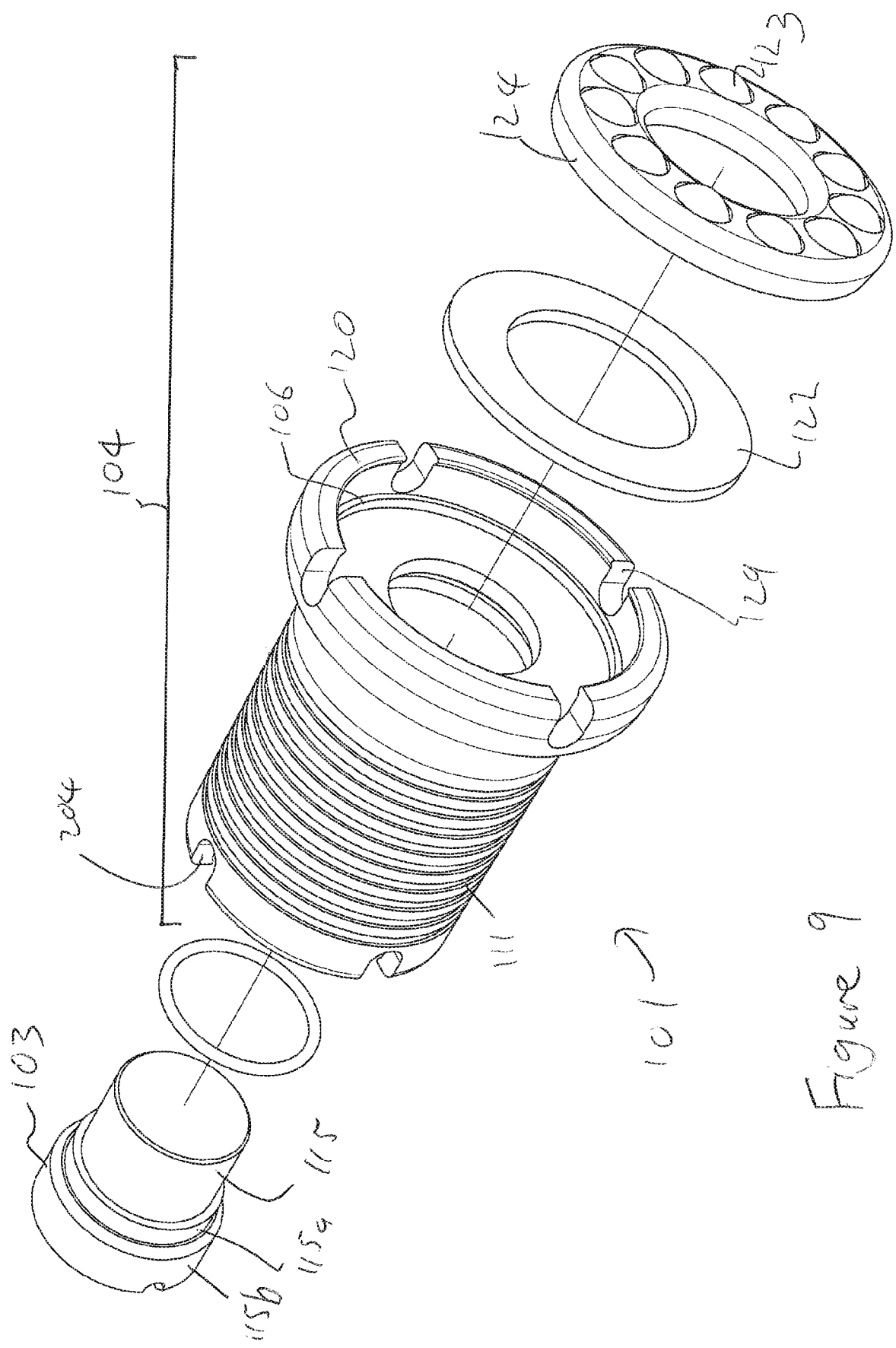
FIG. 9 shows an exploded perspective view of the cap of FIG. 7.
Figure 10:
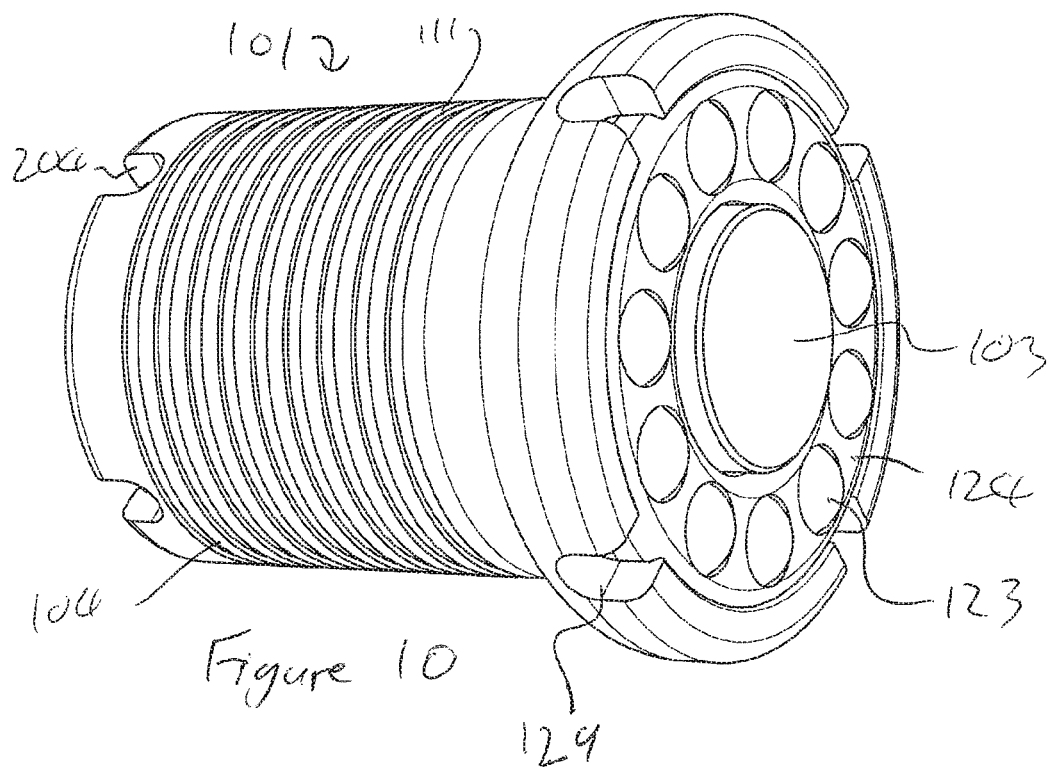
FIG. 10 shows a front perspective view of the cap of FIG. 7.
Figure 11:
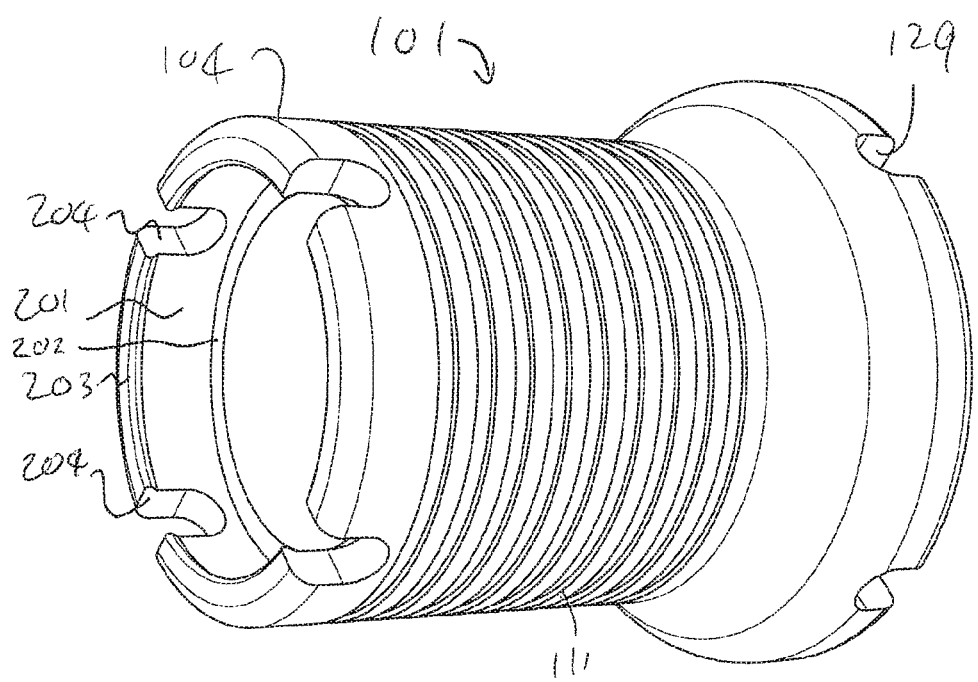
FIG. 11 shows a rear perspective view of the cap of FIG. 7.

The main difference between the first and second embodiments is that the second embodiment is that the cap 101 is a cap assembly formed from two cap parts; a nose cap 103 and a roller cap 104, best seen separately in the exploded view in FIG. 9. The nose cap 103 is connected to the nose of the probe 102, whilst the roller cap 104 is arranged radially outwardly of the nose cap 103, houses the rolling bearing elements 123 and comprises grip formations 119. These two cap parts 103, 104 can be adjustably connected so as to ensure an accurate axial distance between the plane of the rolling bearing elements 123 and the probe tip 107.

As in the first embodiment, the probe 102 comprises a spring-loaded probe tip 107 arranged at the front of the nose 114 of the probe and a circumferential rib 109 is provided on the nose 114, extending radially outwardly therefrom. The rib 109 again has a triangular profile again, a sleeve 110 is provided rearward of the circumferential rib 109, and the nose 114. Additionally, this probe has a flange 200 towards the rear of the sleeve.

The cap assembly 101 is generally cylindrical in shape; the roller cap 104 is formed of a generally tubular housing 111, which in this embodiment has two open ends. The front end, however, has a narrower opening than the rear end.

At the rear end of the generally tubular housing 111 of the roller cap 104, an annular pocket 201 is provided. The annular pocket 201 is designed specifically to receive and locate the flange 200 of the probe 201. Accordingly, the annular pocket has a stop surface 202 to engage with the front edge of the flange 200 and at its rear end, a radially inwardly extending lip 203, arranged tightly grip the rear edge of the flange 200 holding it in position against the stop surface and thus fixing the axial location of the probe 102 relative to the roller cap 104. Like the front of the cap of the first embodiment, to allow the flange 200 to be forced past the lip 203, a series of (four) thin cutouts 204 extend from the rear of the annular pocket 201.

The nose cap 103 is also generally cylindrical in shape and includes a closed end 112. The nose cap 103 is fitted to the probe 101 with its closed end 112 proximate to the tip 107. The closed end 112 includes an internal recess 113 at its centre, in which the extreme end of the probe tip 107 is seated. Radially outwardly of the recess 113, the closed end 112 is thicker and forms a disk-shaped central portion with a diameter slightly greater than that of the nose 114 of the probe 102. A cylindrical wall 115 depends rearwardly from the periphery of the central portion of the closed end 112.

The cylindrical wall 115 is stepped, having a wider portion towards the rear (from about half way along its length) and having a portion with a wider inner circumference 116 also towards the rear, starting slightly in front of the wider portion 115a. The wider portion 115a is arranged to interface with the inner cylindrical surface of the housing 111 of the roller cap 104. To this end, the wider portion 115a is provided with a threaded region 115b extending radially outwardly therefrom. This threaded portion 115b can be screwed into a corresponding internal thread 111a, which is provided in the inner cylindrical surface of the housing 111. Forward of the threaded portion 111a, a shoulder 111b is provided, the shoulder extending radially inwardly and arranged to receive an o-ring 105 to seal between the (inner) nose cap 103 and the (outer) roller cap 104.

Forward of the shoulder 111b, an annular shim washer receiving surface 118 is provided. This shim washer receiving surface extends orthogonally to the axis of the cylindrical housing 111, in the region where the inner circumference becomes wider 116.

At the radial outer edge of the shim washer receiving surface 118, a further, shorter, tubular portion of the housing 111 extends forward, forming a mouth 120.

Thus, in this cap assembly 101, the mouth 120, shim washer receiving surface 118 and the cylindrical wall 115 of the nose cap 103 together define an annular cavity 121 which is open at the front of the cap assembly 101. At the front of the mouth 120, a radially inwardly extending lip 128 is formed. Four narrow cutouts 129 (best seen in FIGS. 9 to 11) extend rearwardly from the front of the mouth 120.

At the back of the annular cavity 121 a shim washer 122 is provided. The shim washer 122 is radially restrained by a shoulder 106.

As in the first embodiment, the front face of the shim washer 122 is arranged to abut a ring of rolling bearing elements 123, again eleven high-carbon chrome bearing steel balls, held in identical fashion to the first embodiment in an annular cage 24.

The cage 124 is restrained in the cavity 121 in the same manner as the first embodiment by the lip 128 at the radially inner (and axially outer) edge of the mouth 120.

Accordingly, the rolling bearing elements 123 are held in position between the inner edges of the apertures at the front of the cage 124 and the shim washer 122 at the rear. However, the dimensions of the cage 124 are closely controlled, such that the rolling bearing elements 123 are free to spin in any direction.

The control of the dimensions of the cage 124, together with the dimensions of the cavity and the thickness of the shim washer 122 serve to fix the axial position of the balls, whilst allowing them to freely rotate, the axial distance from their axially foremost point to the foremost point of the tip 107 of the probe is fixed, within manufacturing tolerances.

However, to achieve accuracy beyond manufacturing tolerances, the relative axial position of the nose cap 103 and roller cap 104 can be adjusted during assembly, and fixed before sale, so as to provide the very high level of accuracy in terms of the spacing of the probe tip 107 from the surface to be measured, that is required when assessing average surface roughness. Because the probe tip 107 is spring loaded, the tip 107 is always in contact with the bottom face of the recess 113 inside the nose cap 103, so adjustment of the axial position of the nose cap 103 relative to the roller cap 104 fine-tunes the axial distance between the axially foremost point of the balls and the axially foremost point of the tip 107.

To manufacture the cap assembly 101, the housing and nose caps are formed by suitable methods. The shim washer 122 is installed in the mouth 120. After that, the cage 124 containing the balls (which may be purchased pre-assembled) is forced into the cavity. This pushes the lip 129 of the mouth 120 outwards, with the narrow cutouts 129 allowing the mouth 120 to flex outwards slightly, once the cage passes the lip 128, the mouth closes back to its original position, with the lip restraining the cage 124 and associated rolling bearing elements 123 in position.

Subsequently, the o-ring 105 can be installed and the nose cap 103 can be screwed into the roller cap 104, and tested and adjusted to ensure that when completed, the relative axial position of the foremost plane of the rolling bearing elements 123 and the tip 107 of the probe 102 will be correct. Once this is set, the two parts 103, 104 of the cap assembly 101 can be locked in position.

Finally, the probe 102 is installed by pushing it into the assembled cap assembly 101, such that the flange 200 is held in position in the annular pocket 201 by the lip 203.

In use, with the cap 101 fitted on the probe 102, it can be used to scan the surface of a substrate (not shown) and take continuous measurements of average roughness along the surface without damaging the substrate or wearing down the cap 101, in the same manner that the probe 2 of the first embodiment is used to measure coating thickness.

The above embodiments are described by way of example only. Many variations are possible without departing from the scope of the invention as defined in the appended claims.

The invention claimed is:

1. A probe for measuring a property of a substrate, or a cap for such a probe configured to be disposed at the tip of the probe; wherein the probe or cap comprises one or more rolling bearing elements arranged to bear on the substrate to be measured and mounted for multi-axial movement.

2. A probe or cap according to claim 1 wherein the one or more rolling bearing elements are held in a cage.

3. A probe or cap according to claim 2 wherein the cage is annular.

4. A probe or cap according to claim 1 wherein a shim is provided behind the one or more rolling bearing elements, opposite the region of the one or more rolling elements which will bear on the substrate in use.

5. A probe or cap according to claim 1 wherein the one or more rolling bearing elements are balls.

6. A probe or cap according to claim 1 wherein a grip is provided for gripping the probe in use, the grip depending from the one or more rolling bearing elements and provided on a housing, wherein the housing houses the one or more rolling bearing elements.

7. A cap or probe according to claim 6 and including a plurality of rolling bearing elements provided in a plane, wherein the grip extends perpendicular to the plane.

8. A cap or probe according to claim 7 wherein the grip is tubular, and has a length of at least 3 cm extending away from the rolling bearing elements and a width of at least 2 cm.

9. A probe according to claim 1 which is an electromagnetic probe such as a coating thickness measurement probe, or an average surface roughness measurement probe.

10. A probe according to claim 1, the probe comprising a nose cap and the nose cap being connected to a roller cap, the roller cap comprising the one or more rolling bearing elements, wherein relative axial disposition of the nose cap and the roller cap is adjustable.

11. A probe according to claim 1 wherein the one or more rolling bearing elements is plurality of rolling bearing elements arranged radially outwardly of the tip of the probe.

12. A probe according to claim 11 wherein the rolling bearing elements are arranged in a plane, the plane being orthogonal to a longitudinal axis of the probe.

13. A probe according to claim 6 wherein the grip is parallel with the longitudinal axis of the probe.

14. A probe according to claim 1, wherein a fixed predetermined axial gap is provided between the region of the rolling bearing elements that contact the surface of the substrate and the tip of the probe, and wherein the rolling bearing elements are incompressible.

15. A probe according to claim 1 comprising a cap, the cap comprising rolling bearing elements and being fixedly attached to the probe.

16. A probe according to claim 1 comprising a cap, the cap comprising rolling bearing elements and removably attached to the probe.

17. A cap for a probe according to claim 1, wherein a plurality of rolling bearing elements are provided in a ring, the ring arranged so as to surround the tip of the probe in use.

18. A cap for a probe according to claim 1 the rolling bearing elements arranged in a plane and the plane being orthogonal to a longitudinal axis of the probe in use.

19. A measuring instrument comprising the probe of claim 1, or comprising a probe fitted with a cap according to claim 1; the measuring instrument comprising a gauge arranged to receive signals from the probe and to output one or more measurement.

20. A method of measuring a property of a substrate using a probe comprising one or more rolling bearing elements arranged to bear on the substrate to be measured and mounted for multi-axial movement or a probe fitted with a cap comprising one or more rolling bearing elements arranged to bear on the substrate to be measured and mounted for multi-axial movement; the method comprising placing the probe against the substrate such that the one or more rolling bearing elements bear on the surface of the substrate and moving the probe along the surface of the substrate, such that the one or more rolling bearing elements roll along the surface.

* * * * *